Patented Oct. 26, 1937

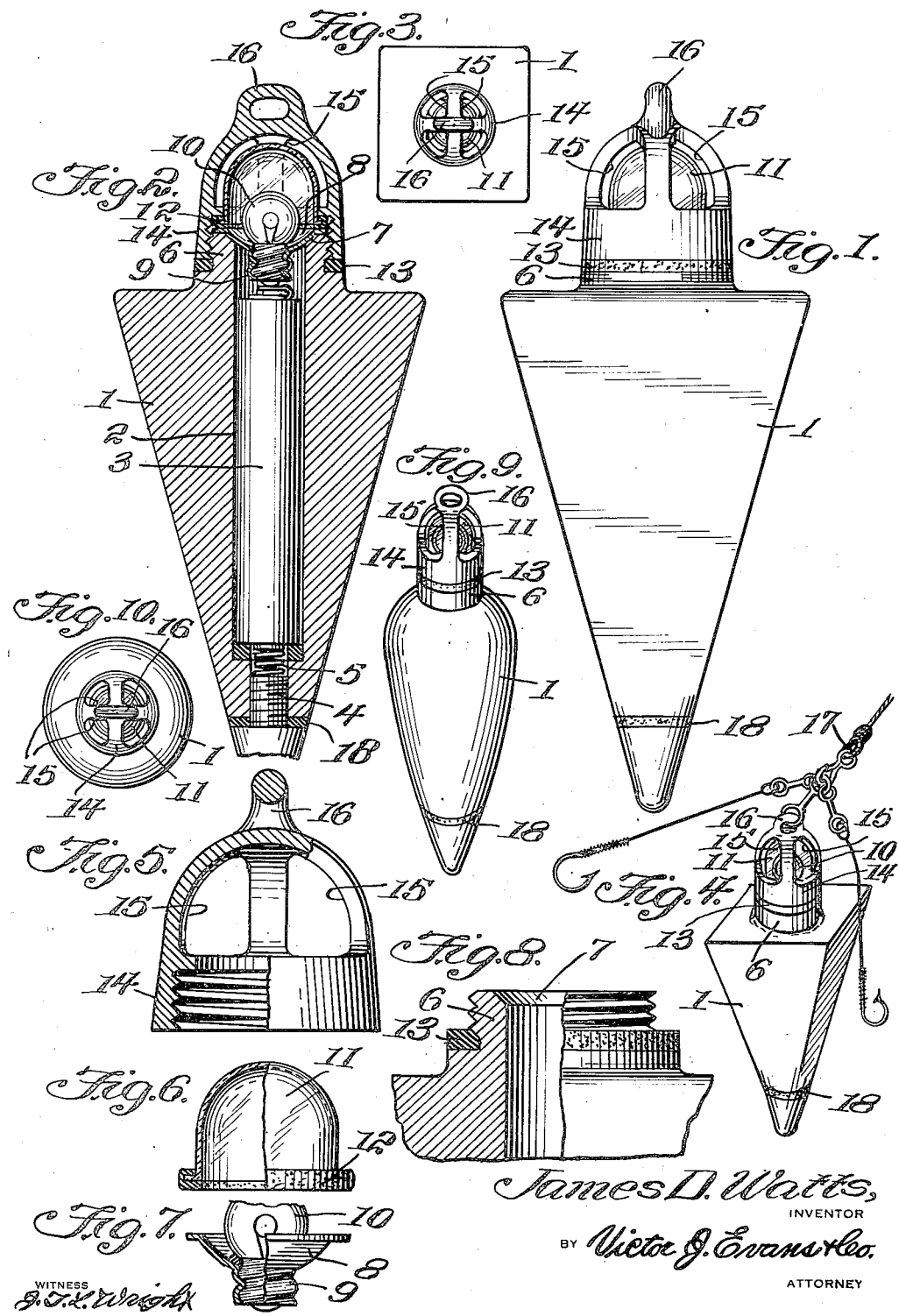

2,097,357

UNITED STATES PATENT OFFICE 2,097,357

ILLUMINATED SINKER

James D. Watts, Wilmington, N. C.

Application February 29, 1936, Serial No. 66,466

1 Claim. (Cl. 43—52)

This invention relates to an illuminated sinker and has for the primary object the provision of a device of this character which may be readily adapted to fishing tackle to act as a sinker therefor and to illuminate the tackle and the bait applied thereto so that fish will be more readily attracted thereto and especially when fishing in the dark and is so constructed that the illuminating means will be efficiently protected against damaging effects of water.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating an illuminated sinker constructed in accordance with my invention.

Figure 2 is a vertical sectional view illustrating the same.

Figure 3 is a top plan view illustrating the device.

Figure 4 is a perspective view illustrating the invention adapted to a fishing tackle.

Figure 5 is a vertical sectional view illustrating a combined protecting cap and tackle attaching means.

Figure 6 is a detail sectional view illustrating the globe for the illuminating means.

Figure 7 is a detail view, partly in section, showing the electric lamp socket and the electric lamp carried thereby.

Figure 8 is a fragmentary sectional view showing the neck to which the cap is applied and which provides a seat for the combined electric lamp socket and reflector.

Figure 9 is a perspective view illustrating a modified form of my invention.

Fig. 10 is a top plan view of the modified form of the device illustrated in Fig. 9.

Referring in detail to the drawing, the numeral 1 indicates a body acting as a weight and which may be of any desired shape, preferably tapering from one end towards the opposite end. In Figures 1 and 2, the body 1 is shown as being of pyramidal shape, however, the body may be shaped as shown in Figure 9, or some other design if desired. Formed in the body 1 is a chamber 2 for the reception of an electric dry cell 3. The reduced or pointed end of the body is removable and is secured in position by a screw threaded stem 4 acting as a closure for one end of the chamber 2 and as an adjustable seat for a spring 5 acting against one end of the dry cell 3. The other end of the chamber 2 opens outwardly through a neck 6 formed on the body. The chamber 2 where opening outwardly through the neck 6 is beveled to form a seat 7 engaged by a reflector 8. The reflector 8 is integral with an electric lamp socket 9 in which is removably secured an electric lamp 10, the contact of which engages a contact of the dry cell 3. A globe 11 overlies the electric lamp and seats on the reflector. A gasket 12 is carried by the globe 11 and also a gasket 13 is mounted on the neck 6. A cap 14 is threaded to the neck 6 and against the gasket 13 and the gasket 12. The cap forms a protector for the globe 11 and has windows 15 therein and also formed on the cap is a tackle attaching eye 16 which may be secured to fishing tackle, as shown at 17, in Figure 4. The globe 11 may be of any desired color and the light rays from the electric lamp pass therethrough and through the windows 15 for illuminating the fishing tackle 17.

A gasket 18 is employed between the removable end of the body and the major portion of the body cooperating with the gaskets 12 and 13 in preventing the entrance of water, moisture or the like to the chamber 2.

The circuit between the dry cell 3 and the electric lamp may be broken in any desired manner or the removable end of the body may be unscrewed, relieving the pressure of the spring 5 on the dry cell so that the contact of the dry cell may become disengaged from the electric lamp.

A device of the character described may be readily adapted to fishing tackle and will act as an efficient weight or sinker therefor and will illuminate the bait applied to the tackle and its construction is such that water, moisture or the like will be excluded from the electrical parts.

Having described the invention, I claim:

An illuminated sinker comprising a weighted body having one end reduced to provide a neck, said body having a bore opening outwardly through the neck and the other end of the body to receive a battery, means closing and sealing the last-named end of the body and providing an electrical connection between the battery and the body, said neck having its end beveled to form a seat, a reflector engaging said seat, an electric lamp carried by the reflector and engaging the battery, a transparent globe engaging the reflector and overlying the electric lamp, a shoulder formed on the neck, gaskets mounted on the shoulder and the flanged globe, a cap disposed over the globe and threaded on the neck and bearing against the gasket of the shoulder and provided with an eye for the attaching of fishing tackle thereto, said cap having windows to expose the globe, and a flange formed on the cap to bear against the gasket on the flange of the globe.

JAMES D. WATTS.